US012627166B2

(12) United States Patent
Sakai et al.

(10) Patent No.: US 12,627,166 B2
(45) Date of Patent: May 12, 2026

(54) CHARGE/DISCHARGE CONTROL SYSTEM AND CHARGE/DISCHARGE CONTROL METHOD

(71) Applicant: HONDA MOTOR CO., LTD., Tokyo (JP)

(72) Inventors: Hideki Sakai, Saitama (JP); Atsushi Sakurai, Saitama (JP); Tatsuya Hattori, Saitama (JP); Yuji Isogai, Saitama (JP)

(73) Assignee: HONDA MOTOR CO., LTD, Tokyo (JP)

( * ) Notice: Subject to any disclaimer, the term of this patent is extended or adjusted under 35 U.S.C. 154(b) by 672 days.

(21) Appl. No.: 18/154,873

(22) Filed: Jan. 16, 2023

(65) Prior Publication Data

US 2023/0261501 A1 Aug. 17, 2023

(30) Foreign Application Priority Data

Feb. 15, 2022 (JP) ................................. 2022-021440

(51) Int. Cl.
*H02J 7/90* (2026.01)
*G06T 7/00* (2017.01)
(Continued)

(52) U.S. Cl.
CPC ............ *H02J 7/971* (2026.01); *G06T 7/0002* (2013.01); *H01M 10/44* (2013.01); *H02J 7/40* (2026.01);
(Continued)

(58) Field of Classification Search
CPC . H02J 7/007188; H02J 7/00032; H01M 10/44
(Continued)

(56) References Cited

U.S. PATENT DOCUMENTS

| | | | | |
|---|---|---|---|---|
| 10,330,734 B2* | 6/2019 | Saha | ...................... | H01G 11/06 |
| 10,637,302 B2* | 4/2020 | Hoque | ................... | H02J 50/90 |

(Continued)

FOREIGN PATENT DOCUMENTS

| | | |
|---|---|---|
| CN | 109064701 A | 12/2018 |
| CN | 109870112 A | 6/2019 |

(Continued)

OTHER PUBLICATIONS

Office Action issued Jun. 23, 2025 in the CN Patent Application No. CN202310098324.2.

*Primary Examiner* — Nathaniel R Pelton
(74) *Attorney, Agent, or Firm* — CKC & PARTNERS CO., LLC

(57) ABSTRACT

The present invention is to provide a charge/discharge control system and a charge/discharge control method capable of performing, in real time, highly accurate analysis of an internal state of a battery that is actually operating in a vehicle, and capable of performing control on the battery with a high accuracy based on the analysis, for improvement of safety. A battery charge/discharge control system 1 includes: an image acquirer 10 arranged in an inside of a battery 100 configured as a liquid battery, and configured to capture an image of the inside of the battery 100; a transferer 30 configured to transfer data of the image captured by the image acquirer 10 and a control signal; and controllers 14 and 50 configured to perform charge/discharge control on the battery based on the data of the image transferred from the transferer 30.

9 Claims, 5 Drawing Sheets

(51) Int. Cl.

| | |
|---|---|
| *H01M 10/44* | (2006.01) |
| *H02J 7/40* | (2026.01) |
| *H04N 7/18* | (2006.01) |
| *H04N 23/56* | (2023.01) |
| *H04N 23/57* | (2023.01) |
| *B60L 50/60* | (2019.01) |
| *B60R 16/023* | (2006.01) |

(52) U.S. Cl.
CPC ............. *H04N 7/183* (2013.01); *H04N 23/56* (2023.01); *H04N 23/57* (2023.01); *B60L 50/60* (2019.02); *B60R 16/023* (2013.01); *G06T 2207/30248* (2013.01)

(58) Field of Classification Search
USPC ........................................... 320/128
See application file for complete search history.

(56) References Cited

U.S. PATENT DOCUMENTS

| | | | | |
|---|---|---|---|---|
| 11,196,092 | B2 * | 12/2021 | Friend ................... | H02J 7/0069 |
| 11,561,083 | B2 * | 1/2023 | Kim ...................... | H01M 10/04 |

| | | | | |
|---|---|---|---|---|
| 2012/0086368 | A1 | 4/2012 | Kawabuchi et al. | |
| 2014/0136132 | A1 | 5/2014 | Maekawa et al. | |
| 2014/0346894 | A1 * | 11/2014 | Csicsay ................. | H01M 10/48 307/116 |
| 2015/0303723 | A1 * | 10/2015 | Raghavan .......... | G01N 21/7703 73/19.01 |
| 2021/0104785 | A1 * | 4/2021 | Willey .................. | H01M 4/386 |
| 2021/0123870 | A1 | 4/2021 | Mahajan | |
| 2021/0310975 | A1 * | 10/2021 | Moon .................. | G01N 27/403 |
| 2022/0123559 | A1 * | 4/2022 | Stefanopoulou ......... | G09B 5/02 |
| 2022/0349943 | A1 * | 11/2022 | Mima ............... | G01R 33/0017 |
| 2022/0357402 | A1 * | 11/2022 | Kendall ........... | H01M 10/4285 |

FOREIGN PATENT DOCUMENTS

| | | | |
|---|---|---|---|
| CN | 113454443 | A | 9/2021 |
| JP | 2012085452 | A | 4/2012 |
| JP | 2014116251 | A | 6/2014 |
| JP | 2017224405 | A | 12/2017 |
| JP | 6414501 | B2 | 10/2018 |
| JP | 2020038756 | A | 3/2020 |
| KR | 20140062406 | A | 5/2014 |

* cited by examiner

CHARGE/DISCHARGE CONTROL SYSTEM AND CHARGE/DISCHARGE CONTROL METHOD

This application is based on and claims the benefit of priority from Japanese Patent Application No. 2022-021440, filed on 15 Feb. 2022, the content of which is incorporated herein by reference.

BACKGROUND OF THE INVENTION

Field of the Invention

The present invention relates to a charge/discharge control system and a charge/discharge control method.

Related Art

A conventional charge/discharge control system and charge/discharge control method ensure safety, by determining a deterioration state of a battery in real time, according to a battery deterioration determination model constructed based on experiments and the like in advance in a battery ECU installed in a vehicle, and on the basis of a voltage, a current and a temperature of the battery in operation that are inputted from various kinds of sensors, and performing charge/discharge at a rate appropriate for a remaining battery capacity of the battery (see, for example, Japanese Unexamined Patent Application, Publication No. 2012-85452). For example, in a case of a battery with a high degree of deterioration, it is possible to prevent the battery from being brought into an unsafe state by stopping charge/discharge. Recently, it has been attempted to improve the accuracy of charge/discharge control by grasping a deterioration state of a battery in more detail by combining the above method with a method of optically observing a state of the inside of the battery from the outside of the battery (see, for example, Japanese Unexamined Patent Application, Publication No. 2014-116251, Japanese Unexamined Patent Application, Publication No. 2020-038756, Japanese Patent No. 6414501 and Specification of Chinese Patent Application, Publication No. 109870112.)

Patent Document 1: Japanese Unexamined Patent Application, Publication No. 2012-85452

Patent Document 2: Japanese Unexamined Patent Application, Publication No. 2014-116251

Patent Document 3: Japanese Unexamined Patent Application, Publication No. 2020-038756

Patent Document 4: Japanese Patent No. 6414501

Patent Document 5: Specification of Chinese Patent Application, Publication No. 109870112

SUMMARY OF THE INVENTION

In the above conventional technologies, for example, if an observation window is provided on a battery case, the battery case is expected to decrease in resistance to a load that can be caused by an active material-induced or electrolytic-solution-induced change in internal pressure accompanying battery charge/discharge decreases. As other methods for analyzing the inside of an actually operating battery without cutting the battery, an X-ray CT method, an electromagnetic induction method and the like are proposed. However, in view of the fact that sufficient resolution cannot be obtained for a pack structure of an actually operating battery in the present circumstances, and that the structure size for the methods is too large and inappropriate for implementation in an actual vehicle, it is unlikely for the methods to contribute to improvement of the accuracy of charge/discharge control for an actual vehicle.

As another method, it is conceivable to construct a more detailed model from a conventional model for estimating a state of an actually operating battery, based on performance estimation results obtained using a pseudo battery imitating the material composition of an actually operating battery (e.g., a small laminated cell or coin cell battery) under conditions imitating operation of a vehicle, and based on research and development results obtained by way of in-situ observations, thereby contributing to improvement of the accuracy of battery control for battery deterioration prediction and the like by an ECU. In this case, however, it is expected that there may be a case where sufficient battery control cannot be performed depending on conditions because conditions of the actually operating battery in a vehicle and conditions of the pseudo-battery do not completely mutually match.

An object of the present invention is to provide a charge/discharge control system and a charge/discharge control method capable of performing, in real time, highly accurate analysis of an internal state of a battery that is actually operating in a vehicle, and capable of performing control on the battery with a high accuracy based on the analysis, for improvement of safety during charge/discharge of the battery.

In order to achieve the above object, an embodiment of the present invention provides a battery charge/discharge control system including: an image acquirer arranged in an inside of a battery configured as an all-solid battery, the image acquirer being configured to capture an image of the inside of the battery; a transferer configured to transfer data of the image captured by the image acquirer and a control signal; and a controller configured to perform charge/discharge control on the battery based on the data of the image transferred from the transferer. Further, an embodiment of the present invention provides a battery charge/discharge control system (for example, a charge/discharge control system 1 described later) including: an image acquirer (for example, an image acquirer 10 described later) arranged in an inside of a battery configured as a liquid battery (for example, a cylindrical lithium-ion battery 100, a prismatic battery with spiral electrodes 100A, a prismatic lithium-ion secondary battery 100B and a coin type lithium battery 100C described later), the image acquirer being configured to capture an image of the inside of the battery; a transferer (for example, a transferer 30 described later) configured to transfer data of the image captured by the image acquirer and a control signal; and a controller (for example, an ECU 50 and a control circuit 14 described later) configured to perform charge/discharge control on the battery based on the data of the image from the transferer. Further, an embodiment of the present invention provides a battery charge/discharge control method including: capturing an image of an inside of a battery (for example, the cylindrical lithium-ion battery 100, the prismatic battery with spiral electrodes 100A, the prismatic lithium-ion secondary battery 100B and the coin type lithium-battery 100C described later); transferring data of the captured image; making determination as to a state of the battery based on the data of the image in real time and transferring a control signal indicating a result of the determination; and performing charge/discharge control on the battery based on the control signal. According to the above configuration, it is possible to perform an in-situ inside observation of a battery configured as an all-solid battery or a liquid battery during actual operation non-destructively with a high resolution, and it is possible to determine a state of the inside and apply control from outside.

The image acquirer and the transferer are isolated by an isolation member (for example, a case 15 described later) that has resistance to an electrolytic solution and is capable of transmitting transmission radio waves, from the electrolytic solution in the inside of the battery. Therefore, it becomes possible to maintain a state of the image acquirer and the transferer not being in contact with the electrolytic solution including salt, and it becomes possible to maintain the functions of the charge/discharge control system. Furthermore, the image acquirer includes a light source (for example, a light source 12 described later) and an image sensor (for example, an image sensor 11 described later); and the light source and the image sensor are covered with a part of the isolation member that is capable of transmitting light (for example, an optical tip cover 152 described later).

The entirety of the isolation member is covered with thin film laminate, and the part capable of transmitting transmission radio waves is configured, with any of polyethylene, modified polyethylene, polypropylene, modified polypropylene and an ionomer being arranged thereon; and a connection part that is electrically connected to the battery is connected by heat welding and configured in a structure that prevents intrusion of the electrolytic solution to the light source and image sensor side relative to the isolation member. Therefore, it is possible to easily realize the isolation member for isolating the image acquirer and the transferer from the electrolytic solution.

Power is supplied from the battery to the image acquirer, the transferer and the controller. Therefore, it becomes possible to eliminate the necessity of separately preparing a power source for supplying power to the image acquirer, the transferer and the controller.

The transferer includes an inside-battery transceiver (for example, a radio wave transceiver 31 described later) arranged in the inside of the battery; the battery includes a casing (for example, a cylindrical can 120 and a cap assembly 140 described later) having a thick part and a thin part; and the inside-battery transceiver is arranged near the thin part. Therefore, it is possible to facilitate data transfer by the transferer between the inside and outside of the battery.

The controller includes an inside-battery controller (for example, the control circuit 14 described later) arranged in the inside of the battery and an outside-battery controller (for example, the ECU 50 described later) arranged outside the battery; and the transferer transfers the data of the image captured by the image acquirer to the outside of the battery, the outside-battery controller transfers the control signal indicating a result of a determination based on the data of the image to the inside of the battery using the transferer, and the inside-battery controller performs, in response to reception of the control signal, charge/discharge control on the battery based on the control signal. Therefore, it is possible to perform charge/discharge control corresponding to a state of the battery from outside the battery.

The determination is made by an ECU (for example, the ECU 50 described later) of a vehicle. Therefore, it becomes possible to collectively perform charge/discharge control on the battery by the ECU, and it becomes possible to perform control related to other control.

According to the present invention, it is possible to provide a charge/discharge control system and a charge/discharge control method capable of performing highly accurate analysis of an internal state of a battery that is actually operating in a vehicle in real time and capable of performing control on the battery with a high accuracy based on the analysis, for improvement of safety.

DETAILED DESCRIPTION OF THE INVENTION

An embodiment of the present invention will be described below with reference to drawings. A charge/discharge control system of the present embodiment is provided in a vehicle V.

Figure 1:
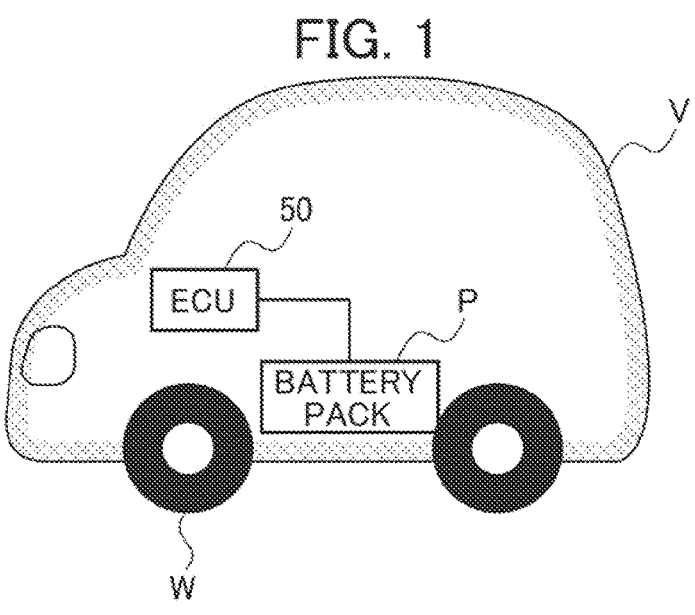
FIG. 1 is a diagram showing that a charge/discharge control system of an embodiment of the present invention is mounted on a vehicle.

As shown in FIG. 1, the vehicle V is provided with drive wheels W, a drive motor not shown, which is coupled with the drive wheels W, and a battery pack P that gives/receives power to/from the drive motor. Though the vehicle V accelerates/decelerates by power generated by the drive motor in the present embodiment, the present invention is not limited thereto. For example, the vehicle V may be a hybrid vehicle mounted with a drive motor and an engine as power generation sources. In addition to the use in a vehicle, the charge/discharge control system can be applied to a backup power source including a control unit (CU), and a battery or a battery pack.

The drive motor not shown is coupled with the drive wheels W via a power transmission mechanism not shown. Torque generated by the drive motor not shown by electricity from the battery pack P being converted to three-phase AC power and supplied to the drive motor is transmitted to the drive wheels W via the power transmission mechanism not shown, causes the drive wheels W to rotate and causes the vehicle V to travel. The drive motor demonstrates the function of a generator when the vehicle V decelerates. The drive motor generates regenerative power and gives regenerative braking torque corresponding to the magnitude of the regenerative power to the drive wheels W. The battery pack P is appropriately charged with the regenerative power generated by the drive motor.

Figure 2:
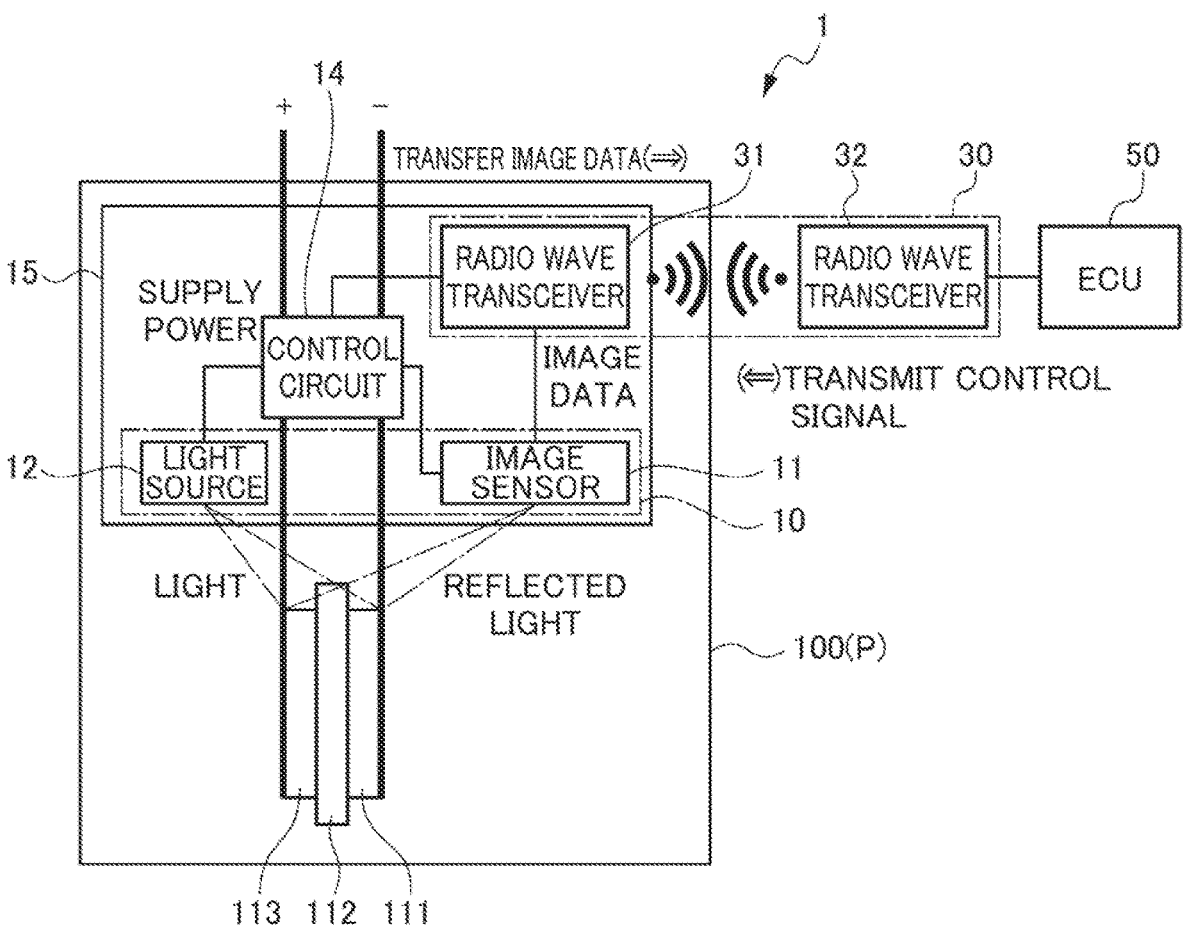
FIG. 2 is a diagram showing a configuration of the charge/discharge control system of the embodiment of the present invention.

As shown in FIG. 2 and the like, a charge/discharge control system 1 is provided with an image acquirer 10, a transferer 30 (a radio wave transceiver 31 and a radio wave transceiver 32) and controllers (a control circuit 14 and an ECU 50). The charge/discharge control system 1 is configured so that data of an image of the inside of the battery pack P obtained by the image acquirer 10 is transmitted to the ECU 50 as an outside-battery controller via the transferer 30, and charge/discharge control on the battery pack P is performed by the ECU 50. Data of values of time, current, voltage or temperature and the like from other sensors may be included in data transferred and transmitted/received between the radio wave transceiver 31 and the radio wave transceiver 32.

The image acquirer 10 is provided with an image sensor 11 configured, for example, with a CCD or the like and a light source 12 configured, for example, with an LED or the like. The image sensor 11 and the light source 12 are electrically connected to the control circuit 14. Under the control of the control circuit 14 as an inside-battery controller, the light source 12 is configured to irradiate a predetermined part inside the battery pack P, and the image sensor 11 is configured to capture an image of the predetermined part.

The transferer 30 is provided with the radio wave transceiver 31 as an inside-battery transceiver and the radio wave transceiver 32 as an outside-battery transceiver. The radio wave transceiver 31 is accommodated inside the battery pack P together with the image sensor 11 and the light source 12 of the image acquirer 10, and the control circuit 14. The radio wave transceiver 32 is provided inside the vehicle V outside the battery pack P. By performing wireless communication by radio waves, such as Wi-Fi, to the radio wave transceiver 32, the radio wave transceiver 31 transmits an image captured by the image sensor 11 from inside the battery pack P to the radio wave transceiver 32 outside the battery pack P. The radio wave transceiver 32 is configured to output data of the image from the radio wave transceiver 31 to the ECU 50 provided inside the vehicle V outside the battery pack P.

Figure 3:
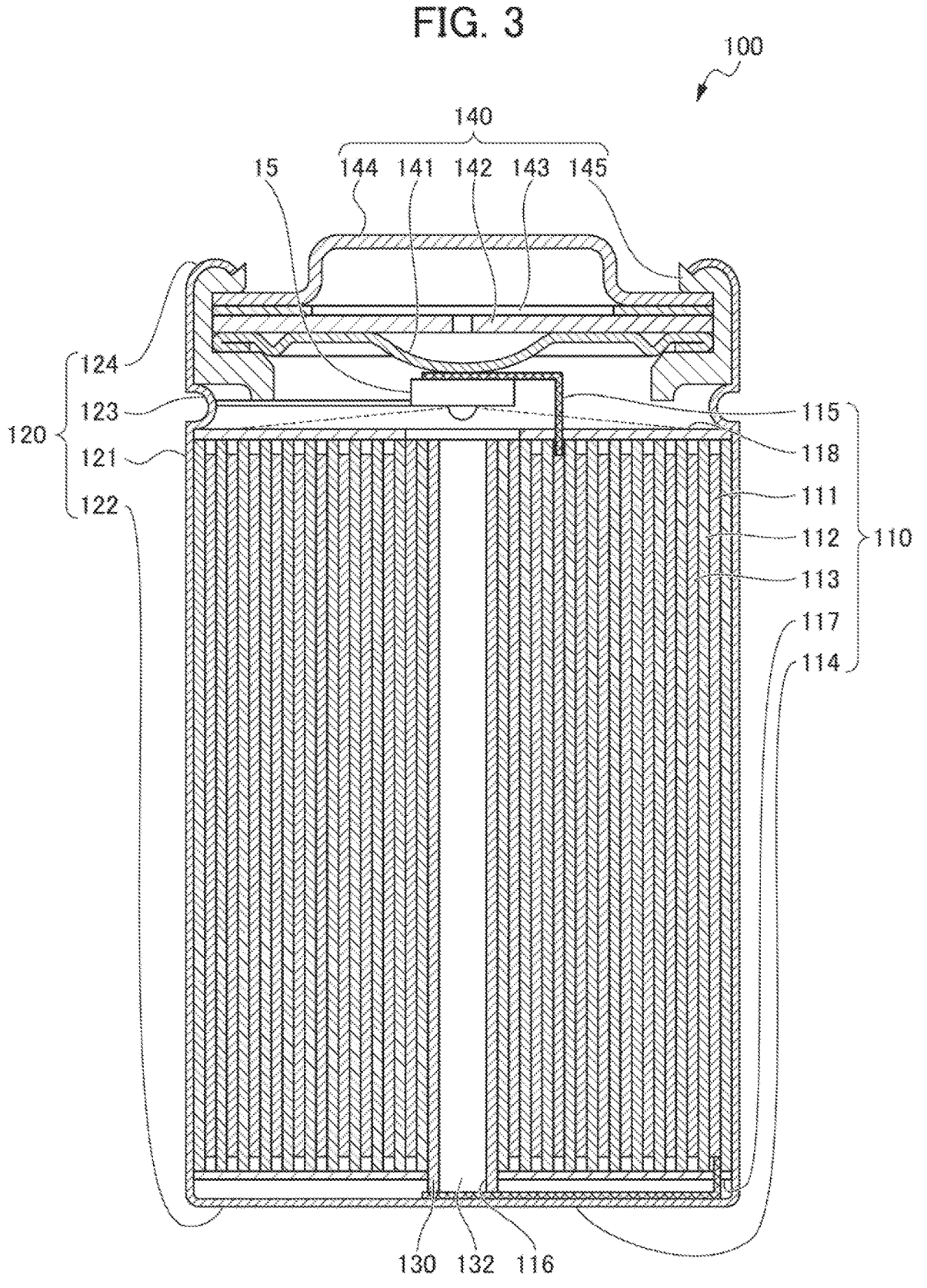
FIG. 3 is a sectional view showing a cylindrical lithium-ion battery provided with an image acquirer and a transferer of the charge/discharge control system of the embodiment of the present invention.

The ECU 50 is provided with a processor that performs various kinds of arithmetic operations, a storage device that stores various kinds of information, an input/output device that controls input/output of data to/from the radio wave transceiver 32, and the like. In the storage device of the ECU 50, a battery state estimation model constructed from various kinds data including data of images has been stored in advance, and the ECU 50 is configured to output a control signal to the control circuit 14 arranged inside the cylindrical lithium-ion battery 100 so as to perform charge/discharge control, based on image data from the cylindrical lithium-ion battery 100. The data stored in the storage device of the ECU 50 in advance may be configured so as to, based on data acquired during operation of the actual vehicle V, evolve the battery state estimation model that is already stored or a battery state estimation model outside the vehicle V to improve the accuracy, The battery pack P is configured with the cylindrical lithium-ion battery 100 which is a liquid battery. As shown in FIG. 3, the cylindrical lithium-ion battery 100 has an electrode assembly 110, a cylindrical can 120, a center pin 130 and a cap assembly 140.

The electrode assembly 110 is provided with a negative plate 111 having negative active material, for example, graphite, a positive plate 113 having positive active material, for example, lithium cobaltate and a separator 112 arranged between the negative plate 111 and the positive plate 113 to prevent a short circuit and enable movement of lithium ions. The negative plate 111, the positive plate 113 and the separator 112 are wound in a cylindrical shape and accommodated in the cylindrical can 120. A negative tab 114 is electrically connected to the bottom part of the negative plate 111. A positive tab 115 is electrically connected to the top part of the positive plate 113.

The cylindrical can 120 has a cylindrical face 121 having a predetermined diameter and an approximately disk-shaped bottom face 122 located at the bottom part of the cylindrical face 121. The top part of the cylindrical can 120 is open. The electrode assembly 110 is inserted from the top part of the cylindrical can 120. The negative tab 114 of the electrode assembly 110 is welded to the bottom face 122 of the cylindrical can 120, and the cylindrical can 120 constitutes a negative electrode. On the bottom face of the electrode assembly 110, a bottom insulation plate 117 is provided. On the top part of the electrode assembly 110, a top insulation plate 118 is provided. Thereby, an electrical short circuit between the electrode assembly 110 and the cylindrical can 120 is prevented.

The center pin 130 is arranged in space 116 formed approximately in the center of the electrode assembly 110. The center pin 130 is rod-shaped, and a hollow portion 132 is formed on the inside of the center pin 130.

In the cap assembly 140, an annular insulating gasket 145 is provided on the inner side of the top part of the cylindrical can 120. On the inner side of the insulating gasket 145, a conductive safety vent 141 connected to the positive tab 115 is provided. The conductive safety vent 141 is broken when the internal pressure inside the cylindrical can 120 increases and releases gas to the outside. On the upper side of the conductive safety vent 141, there is provided a current interrupting plate 142 that is destroyed together when the conductive safety vent 141 is broken and interrupts a current. On the upper side of the current interrupting plate 142, there is provided a positive temperature element 143 by which, in case of an overcurrent, the current is interrupted. On the upper side of the positive temperature element 143, there is provided a conductive positive electrode cap 144 that provides positive electrode voltage.

On the cylindrical can 120, a beading part 123 that is concave inward is formed so that the cap assembly 140 does not come off to the outside, and a clipping part 124 folded inward is formed on the upper side of the beading part 123. The beading part 123 and the clipping part 124 fix and support the cap assembly 140 in the cylindrical can 120.

Inside the cylindrical can 120, an electrolytic solution not shown is injected. The electrolytic solution enables lithium ions generated by electrochemical reaction to move between the negative plate 111 and the positive plate 113 at the time of charging/discharging the cylindrical lithium-ion battery 100.

The image sensor 11 and the light source 12 of the image acquirer 10, the control circuit 14 and the radio wave transceiver 31 are arranged inside a case 15 arranged inside the cylindrical lithium-ion battery 100. As shown in FIG. 3, the case 15 constitutes an isolation member that has resistance to the electrolytic solution and is capable of transmitting light from the light source 12 and transmission radio waves, and the entirety of the case 15, including an optical tip cover 152 described later, is covered with thin film laminate. As the thin film laminate, for example, any of polyethylene, modified polyethylene, polypropylene, modified polypropylene and an ionomer is used. The image sensor 11, the light source 12, the control circuit 14 and the radio wave transceiver 31 are isolated from the electrolytic solution by the case 15. Power of the cylindrical lithium-ion battery 100 is supplied to the image sensor 11, the light source 12, the control circuit 14 and the radio wave transceiver 31. A conductor that is electrically connected to the negative plate 111 and the positive plate 113 of the cylindrical lithium-ion battery 100 is connected to the case 15 by heat welding, at a connection part that is an entrance/exit part to enter the inside of the case 15 and exit the case 15 to the outside, and has a structure that is capable of preventing intrusion of the electrolytic solution of the cylindrical lithium-ion battery 100 to the image sensor 11 and light source 12 side in the inside of the case 15.

Since the top part of the cylindrical can 120 is open as described before, the casing of the cylindrical lithium-ion battery 100 is made thinner for the top part of the cylindrical lithium-ion battery 100 in comparison with other parts of the cylindrical lithium-ion battery 100, that is, the bottom and side parts of the cylindrical lithium-ion battery 100. The case 15 is arranged at a position near the top part of the cylindrical lithium-ion battery 100 that is made thin as described above, the position facing the upper end parts of the negative plate 111, the positive plate 113 and the separator 112.

Figure 4:
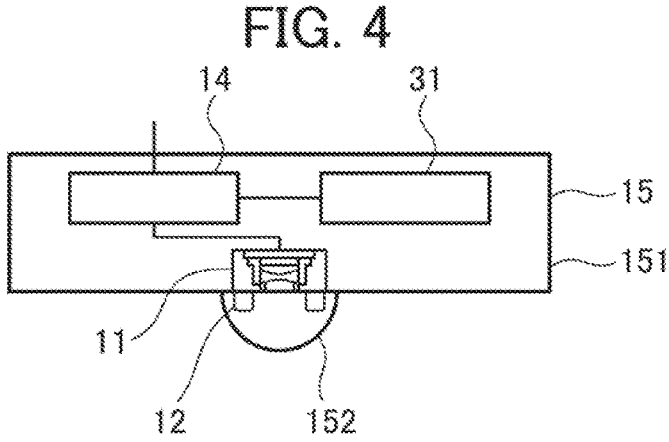
FIG. 4 is an enlarged view showing the image acquirer and the transferer of the charge/discharge control system of the embodiment of the present invention, which are provided in the cylindrical lithium-ion battery.

As shown in FIG. 4, the optical tip cover 152 that is transparent and hemispherical and capable of transmitting light is attached to the bottom part of the case 15, being convex downward and covering the image sensor 11 and the light source 12. Light from the light source 12 is radiated to the upper end parts of the negative plate 111, the positive plate 113 and the separator 112 via the optical tip cover 152. Then, the light radiated to and reflected by the upper end parts of the negative plate 111, the positive plate 113 and the separator 112 is incident to the image sensor 11 through the optical tip cover 152.

Next, a battery charge/discharge control method will be described. In the battery charge/discharge control method, a process for capturing an image of the inside of a battery is performed first. Specifically, by control by the control circuit 14, light is radiated to the upper end parts of the negative plate 111, the positive plate 113 and the separator 112 from the light source 12, and an image of the upper end parts is captured by the image sensor 11.

Next, a process for transferring data of the captured image is performed. Specifically, the data of the image captured by the image sensor 11 is transmitted from the radio wave transceiver 31 to the radio wave transceiver 32 via radio waves.

Next, the state of the battery is determined in real time based on the data of the image, and a process for performing charge/discharge control on the battery is performed. Specifically, the ECU 50 compares the data of the image received by the radio wave transceiver 32 with data about the states of deterioration of the negative plate 111, the positive plate 113 and the separator 112 and the like which have been stored in advance, and determines the states of deterioration of the negative plate 111, the positive plate 113 and the separator 112 and the like in real time. Then, the ECU 50 transmits a control signal indicating a result of the determination as to charge/discharge of the cylindrical lithium-ion battery 100 in comparison with the states of deterioration of the negative plates 111, the positive plates 113 and the separators 112 and the like which have been stored in advance, from the radio wave transceiver 32 to the radio wave transceiver 31. The control circuit 14 receives an input of the control signal from the radio wave transceiver 31 and performs charge/discharge control, such as stop of charge or discharge of the cylindrical lithium-ion battery 100 based on the control signal.

According to the present embodiment, the following effects are obtained. In the present embodiment, the charge/discharge control system 1 includes: the image acquirer 10 arranged inside the cylindrical lithium-ion battery 100, the image acquirer 10 configured to capture an image of the inside of the cylindrical lithium-ion battery 100; the transferer 30 transferring data of the image captured by the image acquirer 10 and a control signal; and controllers (the control circuit 14 and the ECU 50) performing charge/discharge control on the cylindrical lithium-ion battery 100 based on the data of the image from the transferer 30. Further, in the present embodiment, the charge/discharge control method includes: capturing an image of an inside of a battery; transferring data of the captured image; determining a state of the battery based on the data of the image in real time and transferring a control signal indicating a result of the determination; and performing charge/discharge control on the battery based on the control signal. Thereby, it is possible to observe the inside of the cylindrical lithium-ion battery 100 during actual operation non-destructively with a high resolution, and it is possible to determine the state of the inside and apply control from outside. A battery state estimation model constructed from various kinds of data including images is stored in the ECU 50 in advance, and there may be a mechanism in which the model or an external model evolves based on data acquired during operation of the actual vehicle V to improve the accuracy. Thereby, more highly accurate control corresponding to the deterioration state of each battery pack or each battery can be realized.

In the present embodiment, the image acquirer 10 and the transferer 30 are isolated by the case 15 configured with the isolation member that has resistance to the electrolytic solution constituting the cylindrical lithium-ion battery 100 and is capable of transmitting transmission radio waves, from the electrolytic solution inside the cylindrical lithium-ion battery 100. Therefore, it becomes possible to maintain a state of the image acquirer 10 and the transferer 30 not being in contact with the electrolytic solution including salt, and it becomes possible to maintain the functions of the charge/discharge control system 1.

In the present embodiment, the entirety of the case 15 which is an isolation member, including the optical tip cover 152, is covered with the thin film laminate. As the thin film laminate, for example, any of polyethylene, modified polyethylene, polypropylene, modified polypropylene and an ionomer is used. Therefore, it is possible to easily realize the isolation member that is resistant to the electrolytic solution and is capable of transmitting transmission radio waves.

In the present embodiment, power is supplied from the cylindrical lithium-ion battery 100 to the image acquirer 10, the transferer 30 and the controllers (the control circuit 14 and the ECU 50). Therefore, it becomes possible to eliminate the necessity of separately preparing a power source for supplying power to the image acquirer 10, the transferer 30, the control circuit 14 and the ECU 50.

In the present embodiment, the transferer 30 includes the radio wave transceiver 31 as an inside-battery transceiver arranged inside the cylindrical lithium-ion battery 100; the cylindrical lithium-ion battery 100 includes the cylindrical can 120 as a casing having a thick part and a thin part, and the cap assembly 140; and the radio wave transceiver 31 is arranged near the top part of the cylindrical lithium-ion battery 100, which is the thin part. Therefore, it is possible to facilitate data transfer by the transferer 30 between the inside and outside of the cylindrical lithium-ion battery 100.

In the present embodiment, the transferer 30 transfers data of an image captured by the image acquirer 10 to the outside of the cylindrical lithium-ion battery 100; and the ECU 50 transmits a control signal indicating a result of determination as to charge/discharge of the cylindrical lithium-ion battery 100 in comparison with states of deterioration of the negative plate 111, the positive plate 113 and the separator 112 and the like from the radio wave transceiver 32 to the radio wave transceiver 31. The control circuit 14 receives an input of the control signal from the radio wave transceiver 31 and performs charge/discharge control, such as stop of charge or discharge of the cylindrical lithium-ion battery 100 based on the control signal. Therefore, it is possible to perform charge/discharge control corresponding to the state of the cylindrical lithium-ion battery 100 from outside the cylindrical lithium-ion battery 100.

In the present embodiment, the determination and control by the controllers is performed by the ECU 50 of the vehicle V. Therefore, it becomes possible to collectively perform charge/discharge control on the cylindrical lithium-ion battery 100 by the ECU 50, and it becomes possible to perform control related to other control.

Next, description will be made on an example in which the image acquirer 10 and the radio wave transceiver 31 of the transferer 30 of the embodiment of the present invention are provided in a prismatic battery with spiral electrodes.

Figure 5:
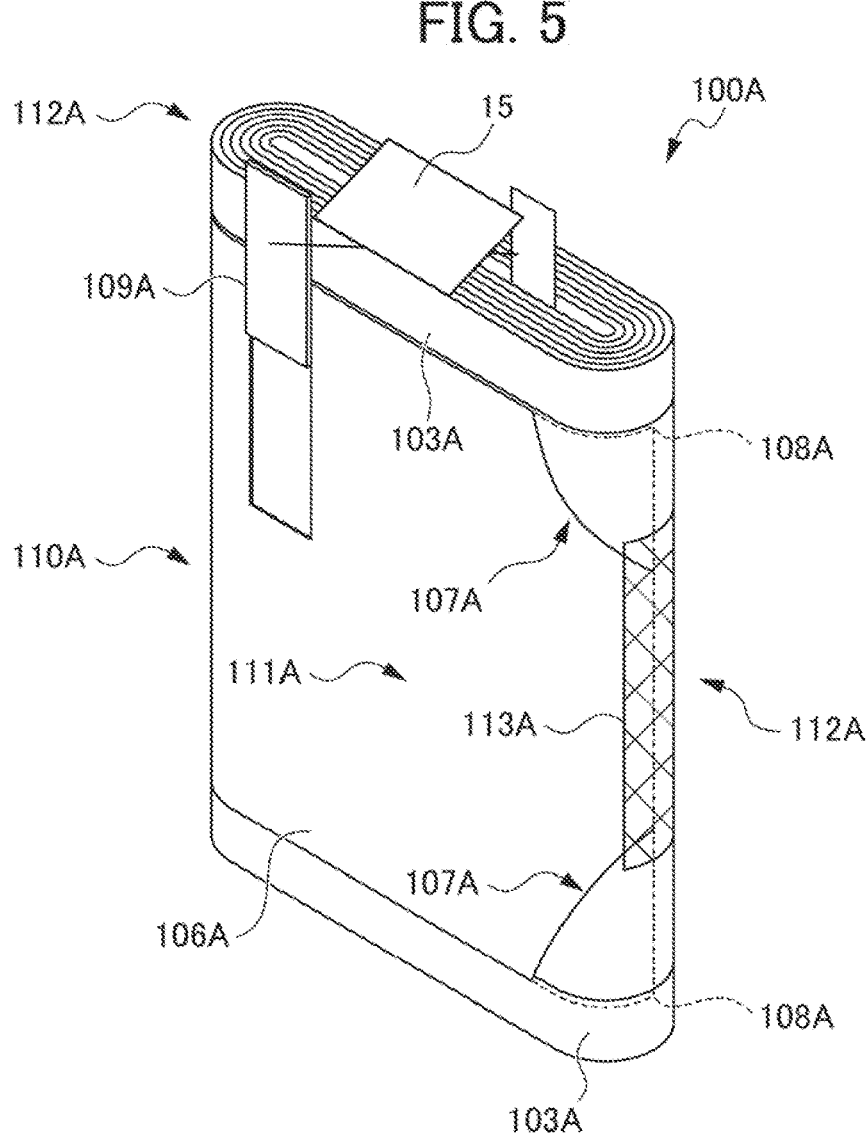
FIG. 5 is a perspective view showing a prismatic battery with spiral electrodes, which is provided with the image acquirer and the transferer of the charge/discharge control system of the embodiment of the present invention.

As shown in FIG. 5, in the prismatic battery with spiral electrodes 100A configured as a non-aqueous electrolyte secondary battery such as a lithium-ion secondary battery, an electrode body 110A obtained by laminating and winding first and second electrode plates including positive and negative electrodes, respectively, with a separator 103A therebetween is accommodated in an exterior body not shown. Each of the first and second electrode plates is configured by active material layers being laminated on the surface of a core body made of metal foil. Aluminum foil is used for the core body of the positive electrode, and copper foil is used for the core body of the negative electrode. Active material layers of the first and second electrode plates facing each other are insulated with the separator 103A.

Facing faces of the electrode body 110A obtained by the first and second electrode plates and the separator 103A being laminated and spirally wound in a positional relationship of the axis being oriented in the vertical direction are flat faces 111A, and corner parts each of which connects both sides of the paired flat faces 111A are bending corner parts 112A bending at a predetermined radius of curvature. That is, the electrode body 110A in which the first and second electrode plates are spirally wound with the separator 103A therebetween is pressed from its side faces as if it were tightly fit by flat pressing plates, and the facing faces are the flat faces 111A. The separator 103A insulates the first and second electrode plates, with the separator 103A between the first and second electrode plates. In the electrode body 110A, the width of the separator 103A in the vertical direction is wider than the width of the first and second electrode plates in the same direction. Thereby, in the electrode body 110A, even if the winding positions of the first and second electrode plates become somewhat misaligned, the first and second electrode plates are certainly insulated by the separator 103A.

In the electrode body 110A, the first electrode plate constitutes an outermost electrode plate 106A. Though the outermost electrode plate 106A of the first electrode plate is configured by the active material layers being provided on the surface of the core body, the active material layers are not provided on the termination part, and the termination of the core body without the active material layers is arranged on one bending corner part 112A. On an edge part 108A, which is a corner of the outermost electrode plate 106A of the first electrode plate, chamfered parts 107A are formed.

An unwinding prevention insulating tape 113A is attached to the bending corner part 112A along the bending corner part 112A so as to cover the termination of the outermost electrode plate 106A. The unwinding prevention insulating tape 113A fixes the termination of the outermost electrode plate 106A to the electrode body 110A.

On the electrode body 110A, there is provided a folded piece 109A configured by a part of the core body of the outermost electrode plate 106A located on one flat faces 111A being cut. The folded piece 109A is used as a lead for electrically connecting the outermost electrode plate 106A to the exterior body not shown.

The case 15 is arranged at a position facing the upper end parts of the first and second electrode plates and the separator 103A inside the exterior body not shown and near the top part of the spirally wound electrode body 110A. Similarly to the case of the cylindrical lithium-ion battery 100, the case 15 is attached such that the optical tip cover 152 is convex downward. By the above configuration, power from the prismatic battery with spiral electrodes 100A is supplied to the image sensor 11, the light source 12, the control circuit 14 and the radio wave transceiver 31, and the image sensor 11 of the image acquirer 10 captures an image of the upper end part of the spirally wound electrode body 110A, that is, the upper end parts of the first and second electrode plates and the separator 103A.

Next, description will be made on an example in which the image acquirer 10 and the radio wave transceiver 31 of the transferer 30 of the embodiment of the present invention are provided in the prismatic lithium-ion secondary battery 100B.

Figure 6:
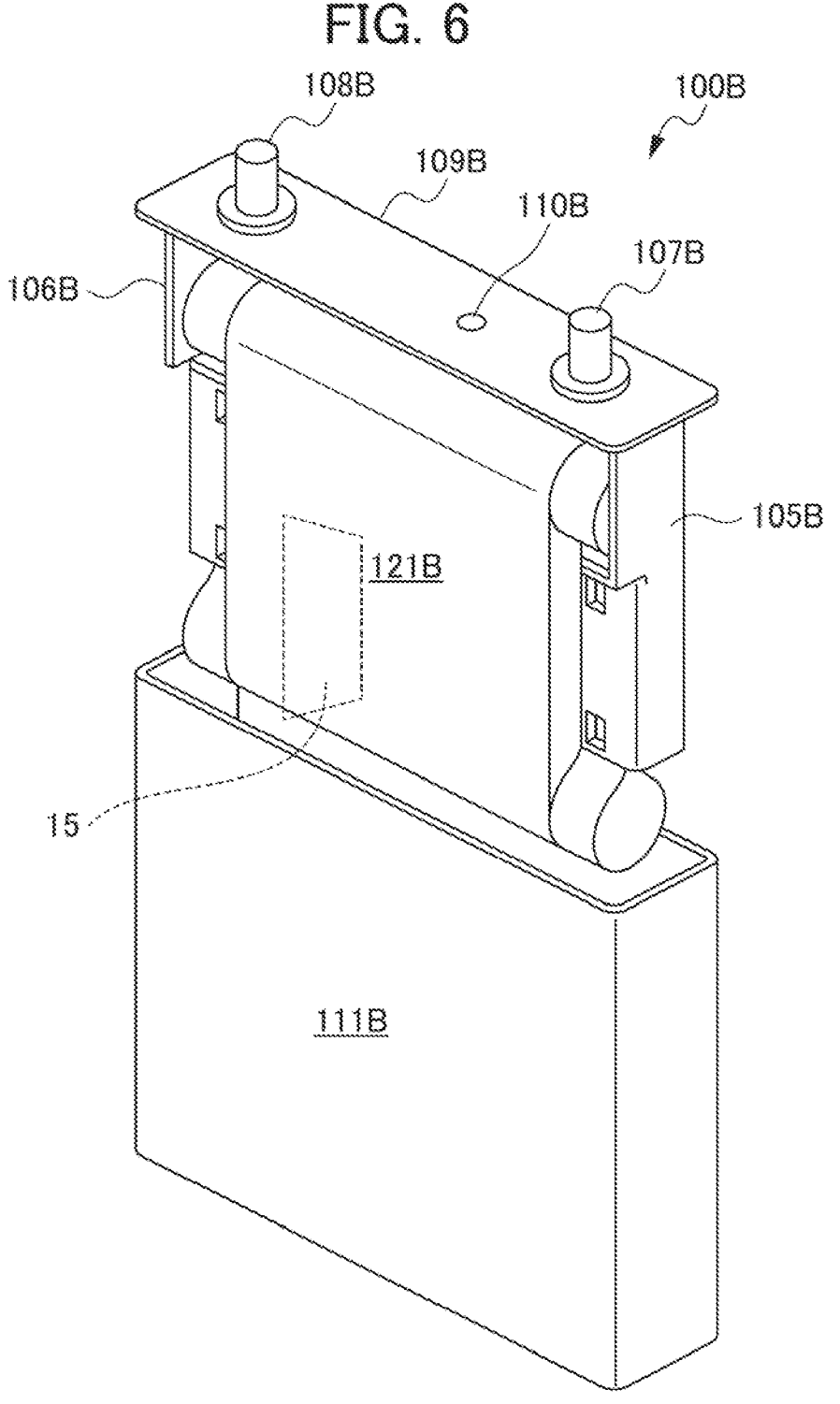
FIG. 6 is a sectional view showing a prismatic lithium-ion secondary battery provided with the image acquirer and the transferer of the charge/discharge control system of the embodiment of the present invention.

As shown in FIG. 6, the prismatic lithium-ion secondary battery 100B has a flat wound electrode group 121B configured by positive and negative electrodes being wound in a positional relationship of the axis being oriented in the horizontal direction, with a separator therebetween. In a battery cover 109B on the top part, an injection hole 110B is formed, and a negative external terminal 107B and a positive external terminal 108B are connected. A negative current collector 105B electrically connects to the negative external terminal 107B, and a positive current collector 106B electrically connects to the positive external terminal 108B. The positive current collector 106B is joined to the positive electrode by welding, and the negative current collector 105B is joined to the negative electrode by welding. The prismatic lithium-ion secondary battery 100B is configured by the flat wound electrode group 121B being inserted into a prismatic battery container 111B, a non-aqueous electrolytic solution being injected into the prismatic battery container 111B through the injection hole 110B and, after that, the injection hole 110B being sealed up.

The case 15 is arranged at a position facing one end part (the left end part in FIG. 6) of the flat wound electrode group 121B, which is configured by the positive electrode and the negative electrode being wound with the separator therebetween, inside the prismatic battery container 111B and near the one end part (the left end part in FIG. 6) of the flat wound electrode group 121B configured by being wound, in the axial direction. The case 15 is attached such that the optical tip cover 152 is convex in a direction from the left side toward the right side in FIG. 6, though the optical tip cover 152 is not shown in FIG. 6.

By the above configuration, power from the prismatic lithium-ion secondary battery 100B is supplied to the image sensor 11, the light source 12, the control circuit 14 and the radio wave transceiver 31, and the image sensor 11 of the image acquirer 10 captures an image of the one end part (the left end part in FIG. 6) of the flat wound electrode group 121B configured by being wound, in the axial direction, that is, the one end part (the left end part in FIG. 6) of each of the wound positive and negative electrodes and separator, in the axial direction.

Next, description will be made on an example in which the image acquirer 10 and the radio wave transceiver 31 of the transferer 30 of the embodiment of the present invention are provided in the coin type lithium battery 100C.

Figure 7:
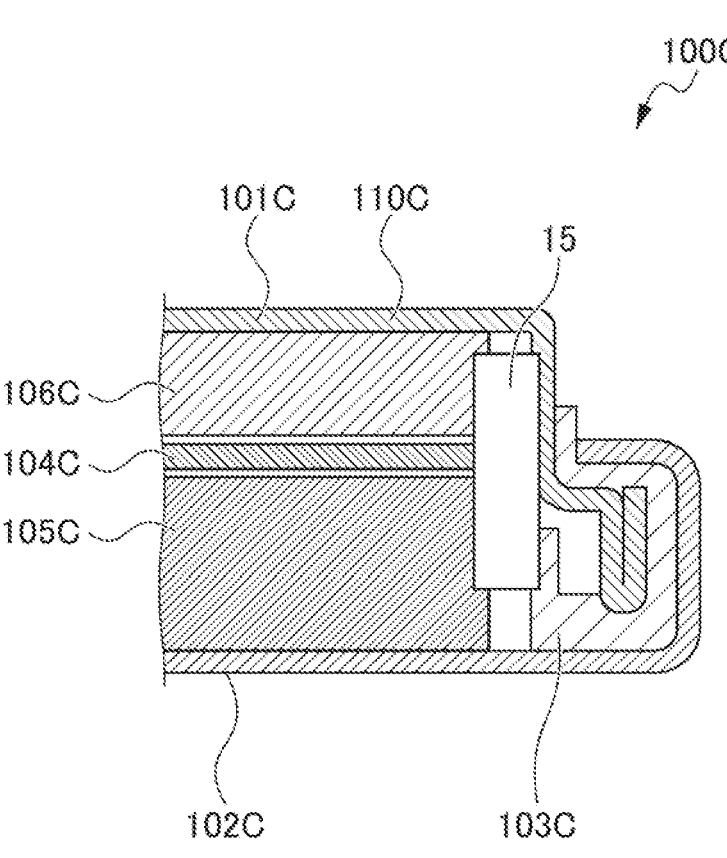
FIG. 7 is a sectional view showing a coin type lithium battery provided with the image acquirer and the transferer of the charge/discharge control system of the embodiment of the present invention.

As shown in FIG. 7, the coin type lithium battery 100C is a coin-shaped lithium battery having a negative electrode sealing plate 101C, a positive electrode case 102C, a gasket 103C, a separator 104C, a positive electrode 105C, a negative electrode 106C and an electrolytic solution not shown. The negative electrode 106C is crimped to the internal surface of a flat part 110C of the negative electrode sealing plate 101C; the separator 104C and the positive electrode 105C are placed on the negative electrode 106C; and the negative electrode 106C is impregnated with the electrolytic solution. The gasket 103C is fitted to the rim part of the negative electrode sealing plate 101C, and the negative electrode sealing plate 101C and the positive electrode case 102C are combined.

The case 15 is arranged at a position facing the end parts (the right end parts in FIG. 7) of the positive electrode 105C, the negative electrode 106C and the separator 104C inside the coin type lithium battery 100C. The case 15 is attached such that the optical tip cover 152 protrudes from the end face of the case 15 on the left side in FIG. 7 and fitted in a concave part formed on the right end sides of the positive electrode 105C, the negative electrode 106C and the separator 104C shown in FIG. 7 though the optical tip cover 152 is not shown in FIG. 7. By the above configuration, power from the coin type lithium battery 100C is supplied to the image sensor 11, the light source 12, the control circuit 14 and the radio wave transceiver 31, and the image sensor 11 of the image acquirer 10 captures an image of the end parts of the positive electrode 105C, the negative electrode 106C and the separator 104C.

A preferred embodiment of the present disclosure has been described above. The present disclosure, however, is not limited to the above embodiment and can be appropriately changed.

For example, though the charge/discharge control system is for performing charge/discharge control on a battery configured as a liquid battery in the present embodiment, the charge/discharge control system is not limited to the configuration. For example, the charge/discharge control system may be for performing charge/discharge control on a battery configured as a nickel metal hydride battery, a laminated lithium-ion battery or an all-solid battery. In this case, the image sensor 11, the light source 12, the control circuit 14 and the radio wave transceiver 31 can be provided inside the nickel metal hydride battery, the laminated lithium-ion battery or the all-solid battery. Further, the liquid battery may include a so-called polymer battery in which a part or all of the electrolytic solution is in a gel state. Further, though the isolation member constituting the case 15 is configured with thin film, the isolation member is not limited thereto. The isolation member may be configured, for example, with an ionic liquid layer.

EXPLANATION OF REFERENCE NUMERALS

1 Charge/discharge control system
10 Image acquirer
11 Image sensor

12 Light source
14 Control circuit (controller, inside-battery controller)
15 Case
30 Transferer
31 Radio wave transceiver
50 ECU (controller, outside-battery controller)
100 Cylindrical lithium-ion battery
100A Prismatic battery with spiral electrodes
100B Prismatic lithium-ion secondary battery
100C Coin type lithium battery
120 Cylindrical can (casing)
140 Cap assembly (casing)

What is claimed is:

1. A battery charge/discharge control system comprising:
an image acquirer arranged in an inside of a battery configured as an all-solid battery, the image acquirer being configured to capture an image of the inside of the battery;
a transferer configured to transfer data of the image captured by the image acquirer and a control signal; and
a controller configured to perform charge/discharge control on the battery based on the data of the image transferred from the transferer,
the controller includes an inside-battery controller arranged in the inside of the battery and an outside-battery controller arranged outside the battery, and
the transferer transfers, by wireless communication, the data of the image captured by the image acquirer to the outside of the battery, the outside-battery controller transfers, by wireless communication, the control signal indicating a result of a determination based on the data of the image to the inside of the battery using the transferer, and the inside-battery controller performs, in response to reception of the control signal, charge/discharge control on the battery based on the control signal.

2. A battery charge/discharge control system comprising:
an image acquirer arranged in an inside of a battery configured as a liquid battery, the image acquirer being configured to capture an image of the inside of the battery;
a transferer configured to transfer data of the image captured by the image acquirer and a control signal; and
a controller configured to perform charge/discharge control in the battery based on the data of the Image transferred from the transferer,
the controller includes an inside-battery controller arranged in the inside of the battery and an outside-battery controller arranged outside the battery, and
the transferer transfers, by wireless communication, the data of the image captured by the image acquirer to the outside of the battery, the outside-battery controller transfers, by wireless communication, the control signal indicating a result of a determination based on the data of the image to the inside of the battery using the transferer, and the inside-battery controller performs, in response to reception of the control signal, charge/discharge control on the battery based on the control signal.

3. The battery charge/discharge control system according to claim 2, wherein
the image acquirer and the transferer are isolated, by an isolation member that has resistance to an electrolytic solution forming part of the battery and that is capable of transmitting transmission radio waves, from the electrolytic solution in the inside of the battery.

4. The charge/discharge control system according to claim 3, wherein the image acquirer comprises a light source and an image sensor, and the light source and the image sensor are covered with a part of the isolation member, the part being capable of transmitting transmission radio waves.

5. The battery charge/discharge control system according to claim 4, wherein an entirety of the isolation member is covered with thin film laminate, and the part capable of transmitting transmission radio waves includes one of polyethylene, modified polyethylene, polypropylene, modified polypropylene and an ionomer; and the isolation member includes a connection part that is electrically connected to the battery, the connection part being connected by heat welding and having a structure capable of preventing intrusion of the electrolytic solution to the light source and image sensor side in an inside of the isolation member.

6. The battery charge/discharge control system according to claim 1, wherein power is supplied from the battery to the image acquirer, the transferer and the controller.

7. The battery charge/discharge control system according to claim 1, wherein the transferer comprises an inside-battery transceiver arranged in the inside of the battery, the battery comprises a casing having a thick part and a thin part, and the inside-battery transceiver is arranged near the thin part.

8. A battery charge/discharge control method comprising:

capturing an image of an inside of a battery;

transferring data of the captured image;

making determination as to a state of the battery based on the data of the image in real time and transferring a control signal indicating a result of the determination; and performing charge/discharge control on the battery based on the control signal, during the transferring data of the captured image, an inside-battery controller arranged in the inside of the battery performs a control to transfer, by wireless communication, the data of the image captured by the image acquirer to the outside of the battery, during the transferring of the control signal indicating the result of the determination, an outside-battery controller arranged outside the battery performs a control to transfer, by wireless communication and to the inside of the battery, the control signal indicating the result of the determination based on the data of the image, during the performing charge/discharge control on the battery, the inside-battery controller performs, in response to reception of the control signal, charge/discharge control on the battery based on the control signal.

9. The battery charge/discharge control method according to claim 8, wherein the determination is made by an ECU of a vehicle.

* * * * *